US012311769B2

(12) United States Patent
Ono (10) Patent No.: US 12,311,769 B2
(45) Date of Patent: May 27, 2025

(54) WORK VEHICLE (71) Applicant: Kubota Corporation, Osaka (JP)

(72) Inventor: Kohei Ono, Sakai (JP)

(73) Assignee: Kubota Corporation, Osaka (JP)

(*) Notice: Subject to any disclaimer, the term of this patent is extended or adjusted under 35 U.S.C. 154(b) by 0 days.

(21) Appl. No.: 18/540,126

(22) Filed: Dec. 14, 2023

(65) Prior Publication Data
US 2024/0217343 A1 Jul. 4, 2024

(30) Foreign Application Priority Data

Jan. 4, 2023 (JP) .................... 2023-000163

(51) Int. Cl.
*B60L 1/00* (2006.01)
*A01D 34/64* (2006.01)
(Continued)

(52) U.S. Cl.
CPC ........ *B60L 1/00* (2013.01); *B60K 1/02* (2013.01); *B60K 17/02* (2013.01); *B60K 17/28* (2013.01); *B60K 25/00* (2013.01); *B62D 49/06* (2013.01); *A01D 34/64* (2013.01); *B60K 2025/005* (2013.01); *B60K 2025/026* (2013.01); *B60Y 2200/221* (2013.01); *B60Y 2200/223* (2013.01)

(58) Field of Classification Search
CPC ...... B60L 1/00; B60L 2240/486; B60L 1/003; B60L 2200/40; B60K 1/02; B60K 17/02; B60K 17/28; B60K 25/00; B60K 2025/005; B60K 2025/026; B60K 25/06; B62D 49/06; A01D 34/64; B60Y 2200/221; B60Y 2200/223
See application file for complete search history.

(56) References Cited

U.S. PATENT DOCUMENTS 1,055,619 A * 3/1913 Dunn .................... F16H 61/444
60/483
1,609,833 A * 12/1926 Robson .................. F16H 39/14
105/62.1
(Continued)

FOREIGN PATENT DOCUMENTS

CN 109733174 A 5/2019
CN 114635950 A 6/2022
(Continued)

*Primary Examiner* — Timothy Wilhelm
(74) *Attorney, Agent, or Firm* — The Webb Law Firm (57) ABSTRACT A work vehicle including a travel device supporting a body of the work vehicle in such a manner as to enable the body to travel; a power take-off shaft configured to output power out from the body; a travel electric motor configured to drive the travel device; a work electric motor configured to drive the power take-off shaft to rotate; a power-transmission-state switching mechanism configured to be switched between (i) an independent power transmission state in which output from the travel electric motor is output to the travel device and in which output from the work electric motor is output to the power take-off shaft, and (ii) a cooperative output power transmission state in which the travel electric motor and the work electric motor are capable of cooperatively outputting power to a drive target; and a control unit configured to control switching of the power-transmission-state switching mechanism.

2 Claims, 6 Drawing Sheets (51) Int. Cl.
  *B60K 1/02*   (2006.01)
  *B60K 17/02*  (2006.01)
  *B60K 17/28*  (2006.01)
  *B60K 25/00*  (2006.01)
  *B60K 25/02*  (2006.01)
  *B62D 49/06*  (2006.01)

(56) References Cited

U.S. PATENT DOCUMENTS

| | | | | |
|---|---|---|---|---|
| 2,031,399 | A * | 2/1936 | White | B60K 25/06 |
| | | | | 56/6 |
| 4,233,858 | A * | 11/1980 | Rowlett | B60K 6/30 |
| | | | | 290/22 |
| 4,359,909 | A * | 11/1982 | Sogo | F16N 7/16 |
| | | | | 184/6.12 |
| 5,046,306 | A * | 9/1991 | Borre, Jr. | F16N 7/32 |
| | | | | 60/39.08 |
| RE34,833 | E * | 1/1995 | Hasegawa | B60K 17/28 |
| | | | | 475/83 |
| 5,406,778 | A * | 4/1995 | Lamb | A01D 34/44 |
| | | | | 56/11.9 |
| 5,557,977 | A * | 9/1996 | Stockton | F16H 47/085 |
| | | | | 475/47 |
| 5,564,518 | A * | 10/1996 | Ishii | B60K 17/344 |
| | | | | 74/665 F |
| 5,644,954 | A * | 7/1997 | Matsufuji | F16H 57/0421 |
| | | | | 74/606 R |
| 5,873,224 | A * | 2/1999 | Murakawa | A01D 34/64 |
| | | | | 56/11.4 |
| 6,048,288 | A * | 4/2000 | Tsujii | B60W 10/30 |
| | | | | 903/910 |
| 6,109,009 | A * | 8/2000 | Benson | B60L 58/21 |
| | | | | 56/10.2 G |
| 6,860,358 | B1 * | 3/2005 | Hauser | B60K 17/105 |
| | | | | 180/305 |
| 6,964,631 | B2 * | 11/2005 | Moses | F16H 61/0031 |
| | | | | 180/65.265 |
| 7,172,040 | B2 * | 2/2007 | Oshima | A01D 69/12 |
| | | | | 74/606 R |
| 7,179,188 | B2 * | 2/2007 | Ishii | B60K 17/043 |
| | | | | 475/74 |
| 7,229,256 | B1 * | 6/2007 | Hauser | F04B 1/22 |
| | | | | 417/269 |
| 7,391,129 | B2 * | 6/2008 | Chiao | B60L 50/16 |
| | | | | 307/9.1 |
| 7,421,917 | B2 * | 9/2008 | Nishino | B60K 17/105 |
| | | | | 74/15.82 |
| 7,578,116 | B1 * | 8/2009 | Howell | B60K 1/04 |
| | | | | 56/11.9 |
| 7,662,062 | B2 * | 2/2010 | Yang | B60W 10/06 |
| | | | | 477/5 |
| 7,690,470 | B2 * | 4/2010 | Iwaki | B62D 9/002 |
| | | | | 180/254 |
| 7,713,157 | B2 * | 5/2010 | Hastings | H02K 7/116 |
| | | | | 475/5 |
| 7,726,275 | B2 * | 6/2010 | Deniston | F02B 67/06 |
| | | | | 123/198 C |
| 8,055,399 | B2 * | 11/2011 | Wyatt | B60L 15/00 |
| | | | | 701/50 |
| 8,092,326 | B2 * | 1/2012 | Amanuma | F16H 55/36 |
| | | | | 474/84 |
| 8,221,284 | B2 * | 7/2012 | Asao | H02K 7/108 |
| | | | | 180/53.8 |
| 8,322,482 | B2 * | 12/2012 | Sprinkle | B60D 1/62 |
| | | | | 180/336 |
| 8,448,541 | B2 * | 5/2013 | Kasuya | B60L 50/16 |
| | | | | 180/65.245 |
| 8,511,216 | B2 * | 8/2013 | Sasahara | F04B 1/20 |
| | | | | 91/506 |
| 8,616,310 | B2 * | 12/2013 | Lopez | B60L 8/003 |
| | | | | 180/53.3 |
| 8,649,925 | B2 * | 2/2014 | Light | G16Z 99/00 |
| | | | | 180/65.21 |
| 8,653,704 | B2 * | 2/2014 | Atarashi | H02K 9/19 |
| | | | | 310/58 |
| 8,668,036 | B2 * | 3/2014 | Wyatt | B60W 10/184 |
| | | | | 180/65.8 |
| 8,678,784 | B2 * | 3/2014 | Atarashi | B60K 6/26 |
| | | | | 417/372 |
| 8,689,759 | B2 * | 4/2014 | Schultz | F02N 11/003 |
| | | | | 123/179.31 |
| 8,808,124 | B2 * | 8/2014 | Major | B60K 25/00 |
| | | | | 180/65.265 |
| 8,818,588 | B2 * | 8/2014 | Ambrosio | B60L 7/14 |
| | | | | 180/65.21 |
| 8,840,511 | B2 * | 9/2014 | Seno | F16H 57/0423 |
| | | | | 184/6.12 |
| 8,905,885 | B2 * | 12/2014 | Yamamoto | B60K 6/26 |
| | | | | 184/6.12 |
| 8,939,240 | B2 * | 1/2015 | Wehrwein | B60W 10/30 |
| | | | | 180/53.8 |
| 8,961,360 | B2 * | 2/2015 | Ooiso | B60L 3/0023 |
| | | | | 475/331 |
| 8,972,139 | B2 * | 3/2015 | Shinohara | B60W 30/18109 |
| | | | | 701/22 |
| 9,022,174 | B2 * | 5/2015 | Takagi | F16H 57/0476 |
| | | | | 184/6.12 |
| 9,033,074 | B1 * | 5/2015 | Gates | F16D 11/10 |
| | | | | 180/53.6 |
| 9,145,054 | B1 * | 9/2015 | Xykis | F16H 7/06 |
| 9,150,090 | B2 * | 10/2015 | Hiyoshi | B60K 17/046 |
| 9,156,348 | B1 * | 10/2015 | Swales | B60K 1/00 |
| 9,210,839 | B2 * | 12/2015 | Schygge | B60L 50/60 |
| 9,263,975 | B2 * | 2/2016 | Wang | A01D 34/78 |
| 9,266,423 | B2 * | 2/2016 | Hoshinoya | B60K 6/48 |
| 9,301,443 | B2 * | 4/2016 | Hashima | B60W 30/18 |
| 9,487,086 | B2 * | 11/2016 | Collett | B60K 25/06 |
| 9,499,199 | B1 * | 11/2016 | Laymon | B62D 11/003 |
| 9,500,197 | B2 * | 11/2016 | Schultz | F16H 57/0439 |
| 9,549,504 | B2 * | 1/2017 | Iida | A01D 69/03 |
| 9,638,076 | B2 * | 5/2017 | Nitta | F16H 57/0439 |
| 9,671,016 | B2 * | 6/2017 | Nakayama | F16H 48/27 |
| 9,677,246 | B2 * | 6/2017 | Yoshizawa | B60K 6/54 |
| 9,726,057 | B2 * | 8/2017 | Yamauchi | H02K 7/116 |
| 9,745,720 | B2 * | 8/2017 | Naito | B60K 6/365 |
| 9,745,722 | B2 * | 8/2017 | Monden | B60L 7/26 |
| 9,751,411 | B2 * | 9/2017 | Benjey | B60L 53/53 |
| 9,765,870 | B1 * | 9/2017 | Fox | F04B 1/26 |
| 9,783,203 | B2 * | 10/2017 | Koike | H02P 23/14 |
| 9,809,186 | B2 * | 11/2017 | Hoshinoya | B60K 7/0007 |
| 9,845,856 | B2 * | 12/2017 | Gutteridge | B60K 17/28 |
| 9,872,438 | B2 * | 1/2018 | Eavenson, Sr. | B60W 10/06 |
| 9,878,616 | B2 * | 1/2018 | Dalum | B60K 25/00 |
| 9,878,748 | B2 * | 1/2018 | Hellholm | B62D 55/084 |
| 9,919,578 | B2 * | 3/2018 | Yan | F16H 7/02 |
| 9,933,066 | B2 * | 4/2018 | Sada | F16H 57/04 |
| 9,937,782 | B2 * | 4/2018 | Boskovitch | B60L 15/2009 |
| 10,099,552 | B2 * | 10/2018 | Long | F16H 57/082 |
| 10,106,027 | B1 * | 10/2018 | Keller | B60K 1/02 |
| 10,202,032 | B2 * | 2/2019 | Faget | F02N 15/02 |
| 10,207,576 | B2 * | 2/2019 | Makino | B60K 17/046 |
| 10,239,534 | B2 * | 3/2019 | Amigo | B60K 17/22 |
| 10,358,040 | B1 * | 7/2019 | Keller | B60K 11/02 |
| 10,427,520 | B2 * | 10/2019 | Dalum | B60K 25/06 |
| 10,458,533 | B2 * | 10/2019 | Ono | F16H 57/0476 |
| 10,539,224 | B2 * | 1/2020 | Hori | F16H 57/0456 |
| 10,563,761 | B2 * | 2/2020 | Daiyakuji | F16H 47/02 |
| 10,690,234 | B1 * | 6/2020 | Oury, Jr. | B60K 11/02 |
| 10,738,878 | B2 * | 8/2020 | Kiyokami | F16H 57/0441 |
| 10,744,862 | B2 * | 8/2020 | Sekiguchi | B60K 25/00 |
| 10,781,910 | B2 * | 9/2020 | Dalum | F16N 29/00 |
| 10,792,993 | B2 * | 10/2020 | Dalum | B60K 6/42 |
| 10,920,871 | B2 * | 2/2021 | Kita | F16H 57/0483 |
| 10,948,070 | B2 * | 3/2021 | Kuhl | F16H 57/0476 |
| 10,974,724 | B1 * | 4/2021 | Shively | B60W 10/06 |
| 10,989,297 | B2 * | 4/2021 | Guarino | F16H 57/0471 |
| 10,998,796 | B2 * | 5/2021 | Ikemoto | H02K 5/203 |
| 11,054,018 | B2 * | 7/2021 | Hori | F16H 57/0434 |
| 11,084,369 | B2 * | 8/2021 | Watt | B60K 6/405 |

(56) References Cited

U.S. PATENT DOCUMENTS

| | | | |
|---|---|---|---|
| 11,145,144 B2* | 10/2021 | Manji | G07C 5/04 |
| 11,192,444 B2* | 12/2021 | Hashimoto | B60W 10/30 |
| 11,287,026 B2* | 3/2022 | Umeki | B60K 6/445 |
| 11,300,036 B2* | 4/2022 | Goto | F01P 7/048 |
| 11,353,103 B2* | 6/2022 | Kawanishi | H02K 7/116 |
| 11,415,028 B2* | 8/2022 | Hori | B60W 10/04 |
| 11,541,749 B2* | 1/2023 | Nishizawa | B60K 17/24 |
| 11,578,798 B2* | 2/2023 | Nakata | F16H 57/0483 |
| 11,584,242 B2* | 2/2023 | Dalum | B60L 58/22 |
| 11,660,959 B2* | 5/2023 | Viitasalo | B60K 17/28 180/53.1 |
| 11,701,959 B2* | 7/2023 | Steinberger | B60K 6/365 475/5 |
| 11,754,169 B1* | 9/2023 | Guarino | F16H 57/0424 74/467 |
| 2003/0188909 A1* | 10/2003 | Ohashi | B60K 25/00 180/300 |
| 2006/0059879 A1* | 3/2006 | Edmond | A01D 34/78 56/6 |
| 2006/0076193 A1* | 4/2006 | Ruther | F16H 57/0456 184/6.12 |
| 2006/0260303 A1* | 11/2006 | Ishii | B60K 17/10 60/487 |
| 2008/0152517 A1* | 6/2008 | Ishii | B60K 17/10 417/423.5 |
| 2009/0018716 A1* | 1/2009 | Ambrosio | B60L 7/14 903/906 |
| 2009/0255741 A1* | 10/2009 | Major | B60K 6/48 474/84 |
| 2011/0190083 A1* | 8/2011 | Harrison, III | F16H 7/02 474/101 |
| 2012/0277944 A1* | 11/2012 | Kaneko | B60L 50/10 903/930 |
| 2013/0157808 A1* | 6/2013 | Treichel | B60K 6/46 475/5 |
| 2014/0155214 A1* | 6/2014 | Kimura | F16H 57/045 475/160 |
| 2014/0158467 A1* | 6/2014 | Kimura | F01M 5/002 184/6 |
| 2016/0129786 A1* | 5/2016 | Petersen | B60K 17/28 192/85.01 |
| 2016/0145833 A1* | 5/2016 | Abdel-Baqi | E02F 9/2217 180/53.4 |
| 2016/0207519 A1* | 7/2016 | Hata | B60W 10/30 |
| 2017/0009771 A1* | 1/2017 | Reul | F04D 29/22 |
| 2018/0106357 A1* | 4/2018 | Kawakami | F16H 57/0423 |
| 2018/0106359 A1* | 4/2018 | Kawakami | F16H 57/0423 |
| 2018/0274660 A1* | 9/2018 | Kita | F16H 57/0445 |
| 2018/0334025 A1* | 11/2018 | Hashimoto | B60K 1/02 |
| 2022/0234434 A1* | 7/2022 | Tottori | B60L 58/26 |
| 2022/0304215 A1* | 9/2022 | Shirafuji | G05D 1/0212 |
| 2022/0377959 A1* | 12/2022 | Nakayama | A01B 63/1013 |
| 2024/0217349 A1* | 7/2024 | Ito | B60L 50/60 |

FOREIGN PATENT DOCUMENTS

| | | |
|---|---|---|
| DE | 102020208200 A1 | 1/2022 |
| JP | 2020108213 A | 7/2020 |

* cited by examiner

WORK VEHICLE

CROSS REFERENCE TO RELATED APPLICATION

This application claims priority to Japanese Patent Application No. 2023-000163, filed Jan. 4, 2023, the disclosure of which is hereby incorporated by reference in its entirety.

BACKGROUND OF THE INVENTION

1. Field of the Invention

The present invention relates to a work vehicle having a configuration in which drive sources mounted on a body of the vehicle are used to drive the body to travel and supply power to a work device.

2. Description of Related Art

Recently, work vehicles using electric motors as the drive sources have been proposed in consideration of environmental concerns. For example, as described in JP 2020-108213A, there is a work vehicle that includes a travel electric motor configured to drive a body of the vehicle to travel, and a work electric motor configured to supply power to a work device, and these electric motors are configured to separately transmit motive power.

In the above-described conventional configuration, the travel electric motor is used only for driving for travel, and the work electric motor is used only for driving the work device. This results in the following problems. That is, in a case where work is not performed but the traveling load is excessive, the traveling may stop due to not enough driving force being provided by the travel electric motor. In a case where traveling is not performed but the work load is excessive, the work may stop due to not enough driving force being provided by the work electric motor. However, increasing the capacities of the travel electric motor and the work electric motor to deal with unexpected situations may lead to the problem of a significant cost increase.

To accommodate such excessive loads, it is conceivable to adopt a configuration in which one large-capacity electric motor is used to perform both driving for travel and the driving of the work device. However, in this case, the drive system for the travel device requires a hydrostatic continuously variable transmission (HST) or the like, which leads to problems such as a reduced mechanical efficiency.

SUMMARY OF THE INVENTION

Therefore, there has been a need to deal with unexpected situations other than normal usage, without increasing the size of electric motors, which causes a cost increase.

A work vehicle according to the present invention includes:
- a travel device supporting a body of the work vehicle in such a manner as to enable the body to travel;
- a power take-off shaft configured to output power out from the body;
- a travel electric motor configured to drive the travel device;
- a work electric motor configured to drive the power take-off shaft to rotate;
- a power-transmission-state switching mechanism configured to be switched between (i) an independent power transmission state in which output from the travel electric motor is output to the travel device and in which output from the work electric motor is output to the power take-off shaft, and (ii) a cooperative output power transmission state in which the travel electric motor and the work electric motor are capable of cooperatively outputting power to a drive target; and
- a control unit configured to control switching of the power-transmission-state switching mechanism.

According to the above aspect of the present invention, in the case of performing normal work traveling in which an external work device is driven by the power take-off shaft while causing the vehicle body to travel, the power-transmission-state switching mechanism is switched to the independent power transmission state. In this case, the travel device can be favorably driven by the travel electric motor, and the work device can be favorably driven by the work electric motor. On the other hand, in the case where an excessive driving load is applied for some reason when the vehicle body is traveling while work is not performed, or when an external work device is being driven by the power take-off shaft while traveling is stopped, the power-transmission-state switching mechanism is switched to the cooperative output power transmission state. In the cooperative output power transmission state, the travel electric motor and the work electric motor can cooperatively output power to the drive target. Such switching of the state of the power-transmission-state switching mechanism is performed by the control unit in response to, for example, an instruction performed through manual operation, or an instruction automatically performed based on the load state or the like.

If an excessive travel load is applied when the vehicle body is traveling while work is not performed, the travel device as the drive target is driven using not only output from the travel electric motor but also output from the work electric motor as well. If an excessive work load is applied when an external work device is being driven by the power take-off shaft while the traveling is stopped, the work device is driven using not only the output from the work electric motor but also the output from the travel electric motor as well.

As a result, it is possible to accommodate an excessive load by effectively using driving force from the travel electric motor and driving force from the work electric motor, without using, as the travel electric motor and the work electric motor, motors with a capacity larger than the driving force required for normal work traveling, which causes an unnecessary cost increase.

Accordingly, it is possible to deal with unexpected situations other than normal usage, without increasing the size of electric motors, which causes a cost increase.

In the above-described configuration, it is preferable that the control unit switches, based on a switching instruction, the cooperative output power transmission state between a first state in which power is output to the travel device as the drive target, and a second state in which power is output to the power take-off shaft as the drive target.

With this configuration, power is output to the travel device in the first state, and it is therefore not necessary to use, as the travel electric motor, a motor with a capacity larger than the driving force required for normal work traveling. In addition, in the second state, power is output to the power take-off shaft, or in other words, an external work device. It is therefore not necessary to use, as the work electric motor, a large-capacity motor capable of outputting a large driving force intended for a load excessively larger than the driving force required for normal work traveling.

In the above-described configuration, it is preferable that the power-transmission-state switching mechanism includes: a travel clutch mechanism provided in a travel power transmission section between the travel electric motor and the travel device, and configured to be switched between a power transmission state in which power from the travel electric motor is transmitted to the travel device, and a disengaged state in which the transmission of power from the travel electric motor to the travel device is disabled; a work clutch mechanism provided in a work power transmission section between the work electric motor and the power take-off shaft, and configured to be switched between a power transmission state in which power from the work electric motor is transmitted to the power take-off shaft, and a disengaged state in which the transmission of power from the work electric motor to the power take-off shaft is disabled; a relay power transmission section configured to transmit power between a portion of the travel power transmission section that is located upstream of the travel clutch mechanism along a power transmission path, and a portion of the work power transmission section that is located upstream of the work clutch mechanism along the power transmission path; and a relay clutch mechanism configured to be switched between a power transmission state in which power transmission by the relay power transmission section is enabled, and a disengaged state in which the power transmission by the relay power transmission section is disabled.

With the above-described configuration, in the case of outputting power to the travel device in the cooperative output power transmission state, the travel clutch mechanism and the relay clutch mechanism can be brought into the power transmission state with the work clutch mechanism being switched to the disengaged state. In the case of outputting power to the power take-off shaft in the cooperative output power transmission state, the work clutch mechanism and the relay clutch mechanism can be brought into the power transmission state with the travel clutch mechanism being switched to the disengaged state.

In this manner, rationally arranging the clutch mechanisms configured to enable and disable the transmission of power can provide an appropriate power transmission state without causing problems such as a cost increase due to use of a complex power transmission mechanism, and a reduced mechanical efficiency.

BRIEF DESCRIPTION OF THE DRAWINGS

The terms Fig., Figs., Figure, and Figures are used interchangeably in the specification to refer to the corresponding figures in the drawings.

DESCRIPTION OF THE INVENTION

An embodiment for carrying out the present invention will be described with reference to the drawings. In the following description, unless particularly specified otherwise, the arrow F shown in the drawings indicates the "forward direction", the arrow B indicates the "rearward direction", the arrow L indicates the "leftward direction", and the arrow R indicates the "rightward direction". The arrow U shown in the drawings indicates the "upward direction", and the arrow D indicates the "downward direction".

Overall Configuration of Tractor

Figure 1:
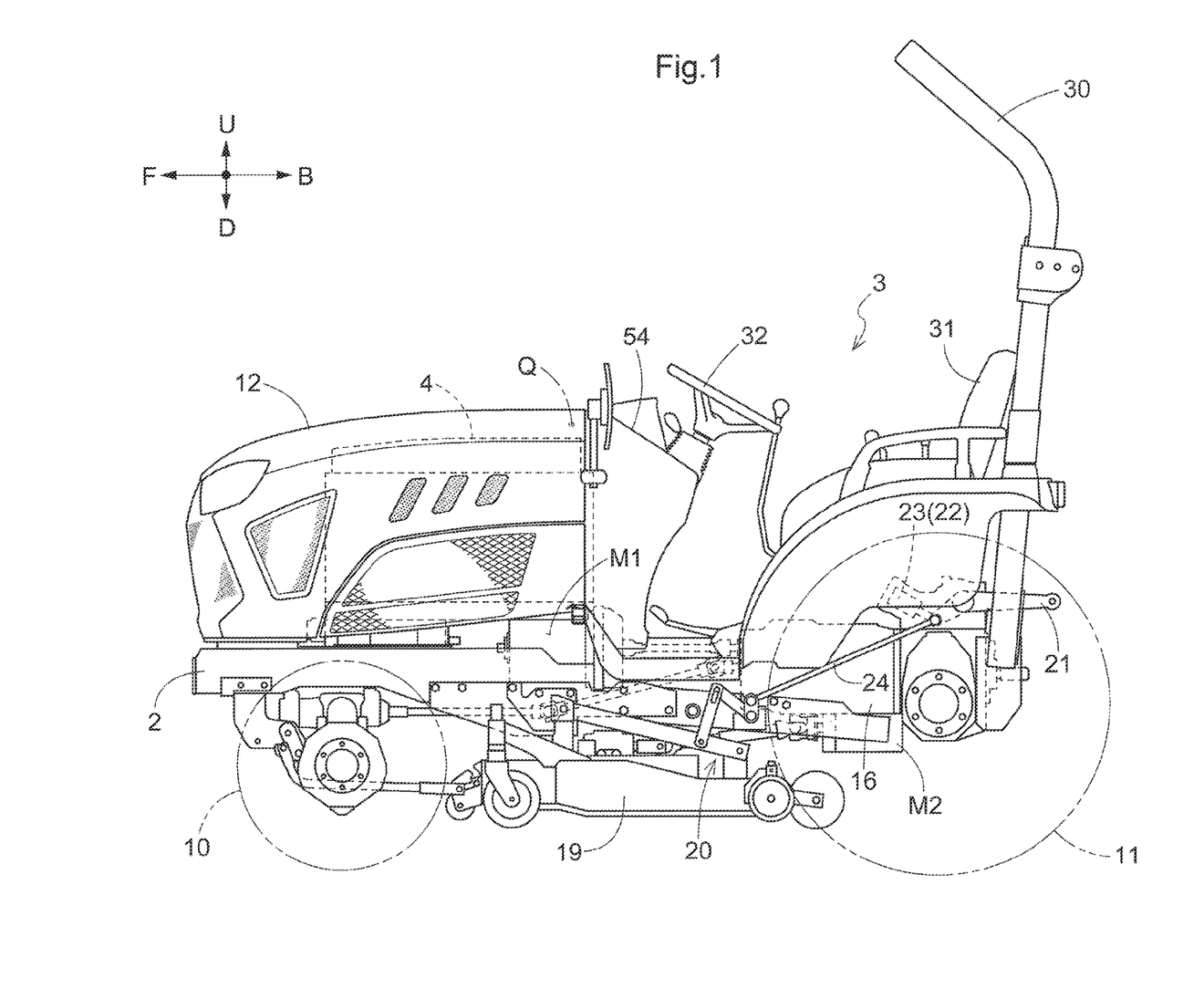
FIG. 1 is an overall side view of a tractor.

A tractor as an example of a work vehicle according to the present invention will be described below. As shown in FIG. 1, the tractor includes left and right front wheels 10 and left and right rear wheels 11 that constitute a travel device 1. The tractor includes a body frame 2 and a driving section 3. The body frame 2 is supported by the left and right front wheels 10 and the left and right rear wheels 11. The driving section 3 is provided at a rear portion of the body. A power transmission case 16 configured to transmit power to the rear wheels 11 is provided below the driving section 3.

The driving section 3 includes a protection frame 30, a driver's seat 31, a steering wheel 32, and other operation tools. An operator can sit on the driver's seat 31. The left and right front wheels 10 can be steered by operating the steering wheel 32. The operator can perform various driving operations in the driving section 3.

A cover member 12 is provided forward of the driving section 3. A large, high-voltage battery is provided inside the cover member 12. The cover member 12 is configured to swing about an opening and closing axis Q extending in the left-right direction of the body. Thus, the cover member 12 can be opened and closed. While the cover member 12 is closed, the battery 4 is covered by the cover member 12.

Figure 2:
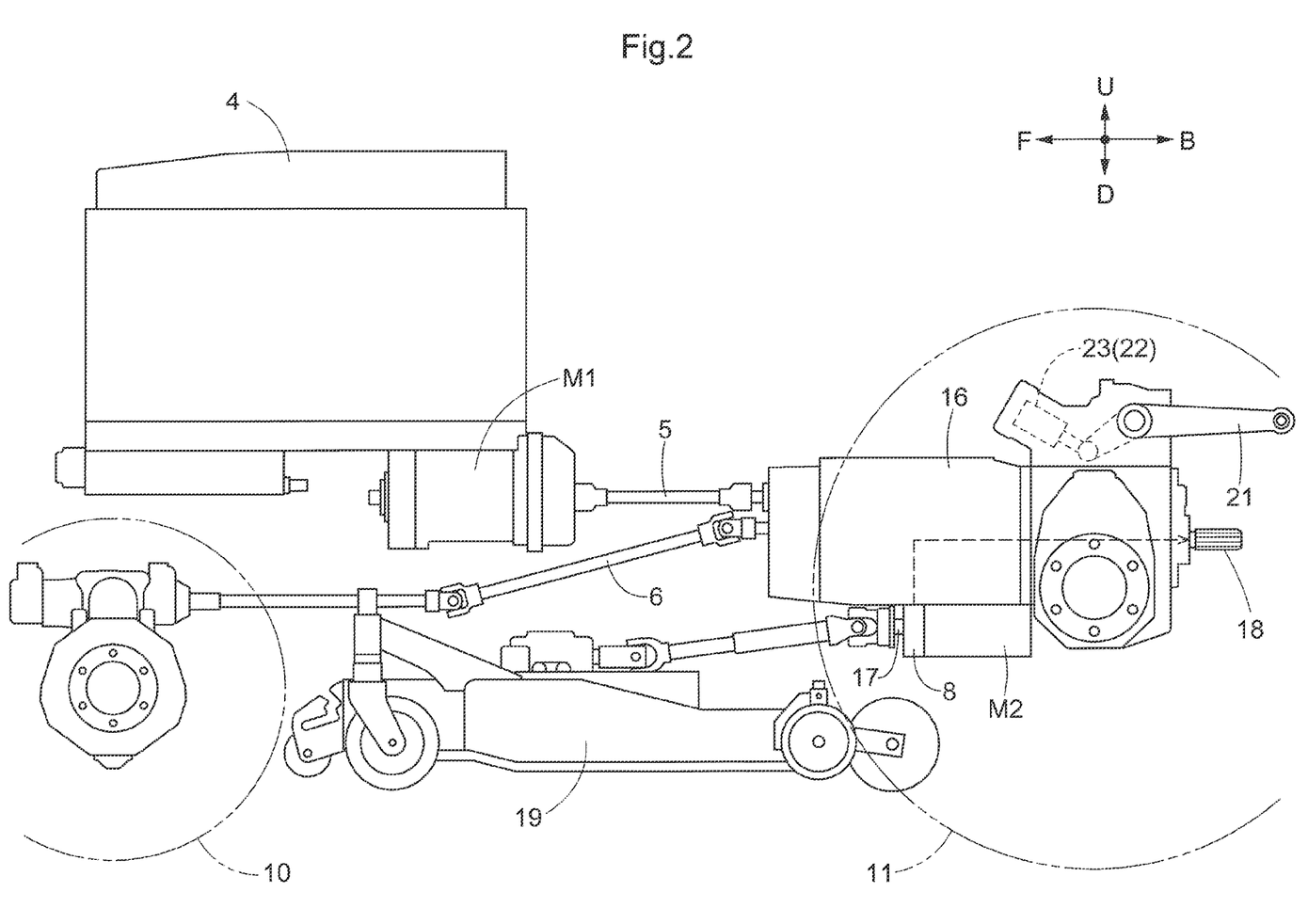
FIG. 2 is a side view showing an arrangement of electric motors and so forth.

As shown in FIG. 2, the tractor includes a travel electric motor (hereinafter referred to as a "travel motor") M1 capable of driving the front wheels 10 and the rear wheels 11. The battery 4 supplies electric power to a travel inverter 14. The travel inverter 14 converts direct-current power supplied from the battery 4 into alternating-current power, and supplies the alternating-current power to the travel motor M1. The battery 4 supplies high-voltage (e.g., several tens to several hundreds of volts) electric power to the travel motor M1 via an electric power supply line 39.

The travel motor M1 is driven by the alternating-current power supplied from the travel inverter 14. The power of the travel motor M1 is transmitted to the rear wheels 11 via an output shaft 5 and a power transmission mechanism (not shown) contained in the power transmission case 16. The power of the travel motor M1 is transmitted from the power transmission case 16 to the fronts wheel 10 via a relay power transmission shaft 6.

The tractor includes a power take-off shaft 7 capable of outputting power to the outside of the body, and a work electric motor (hereinafter referred to as a "work motor") M2 capable of rotationally driving the power take-off shaft 7. Specifically, as shown in FIG. 2, the tractor includes, as the power take-off shaft 7, a mid PTO shaft 17 located at an intermediate position in the vehicle body in the front-rear direction, and a rear PTO shaft 18 located at a rear portion of the vehicle body. The work motor M2 transmits power to the mid PTO shaft 17 and the rear PTO shaft 18. When a work device is connected to the mid PTO shaft 17 or the rear PTO shaft 18, the work device is driven by the rotational power of the mid PTO shaft 17 or the rear PTO shaft 18. For example, in the present embodiment, a mowing device 19 is connected to the mid PTO shaft 17 as shown in FIG. 2. The mowing device 19 is driven by the rotational power of the mid PTO shaft 17. The mowing device 19 is elevatably supported by the body frame 2 via an elevation link mechanism 20.

The rear PTO shaft 18 protrudes rearward from a rear portion of the power transmission case 16. Although not shown, the rear PTO shaft 18 supplies power to a rear-side work device (not shown) attached to a rear portion of the body. The rear-side work device is elevatably coupled to the power transmission case 16 via a link mechanism. A lift arm 21 capable of raising and lowering the rear-side work device is provided above the power transmission case 16. The lift arm 21 is operated to vertically swing by operating a hydraulic cylinder 23 serving as hydraulic equipment 22.

The lift arm 21 and the elevation link mechanism 20 configured to elevatably support the mowing device 19 are interlocked with each other via a push-pull link 24. Accordingly, through extension and contraction of the hydraulic cylinder 23, the mowing device 19 is operated to be raised and lowered in response to vertical swinging of the lift arm 21.

Figure 4:
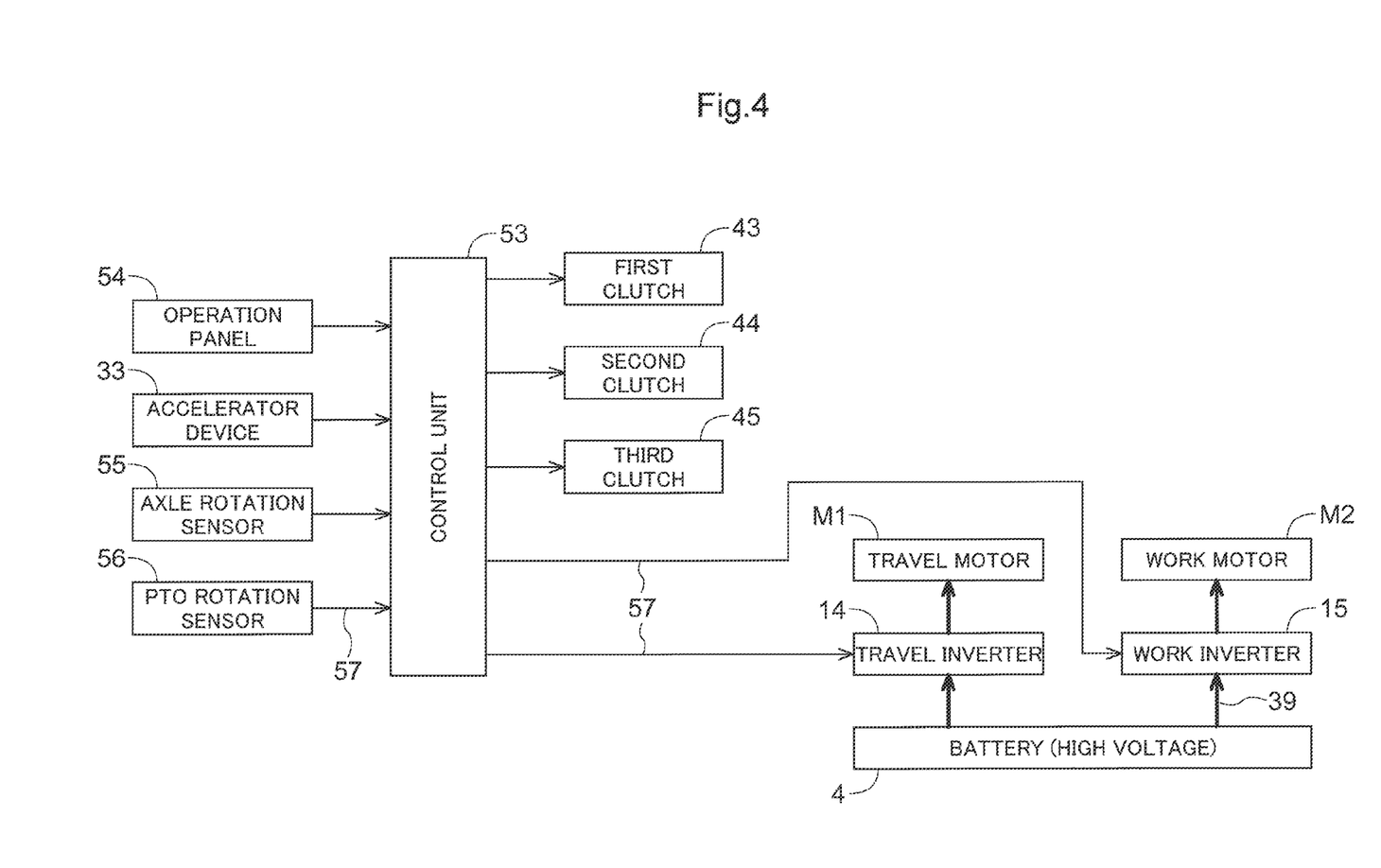
FIG. 4 is a control block diagram.

As shown in FIG. 4, the battery 4 supplies electric power to a work inverter 15 via an electric power supply line 39. The work inverter 15 converts direct-current power supplied from the battery 4 into alternating-current power, and supplies the alternating-current power to the work motor M2 via the electric power supply line 39. Then, the work motor M2 is driven by the alternating-current power supplied from the work inverter 15. The power of the work motor M2 is transmitted to the mid PTO shaft 17 and the rear PTO shaft 18 via a branching device 8.

The tractor includes a power-transmission-state switching mechanism DK capable of being switched between (i) an independent power transmission state in which output of the travel motor M1 is output to the front wheels 10 and the rear wheels 11 and in which output of the work motor M2 is output to the power take-off shaft 7, and (ii) a cooperative output power transmission state in which the travel motor M1 and the work motor M2 are capable of cooperatively outputting power to a drive target.

Figure 3:
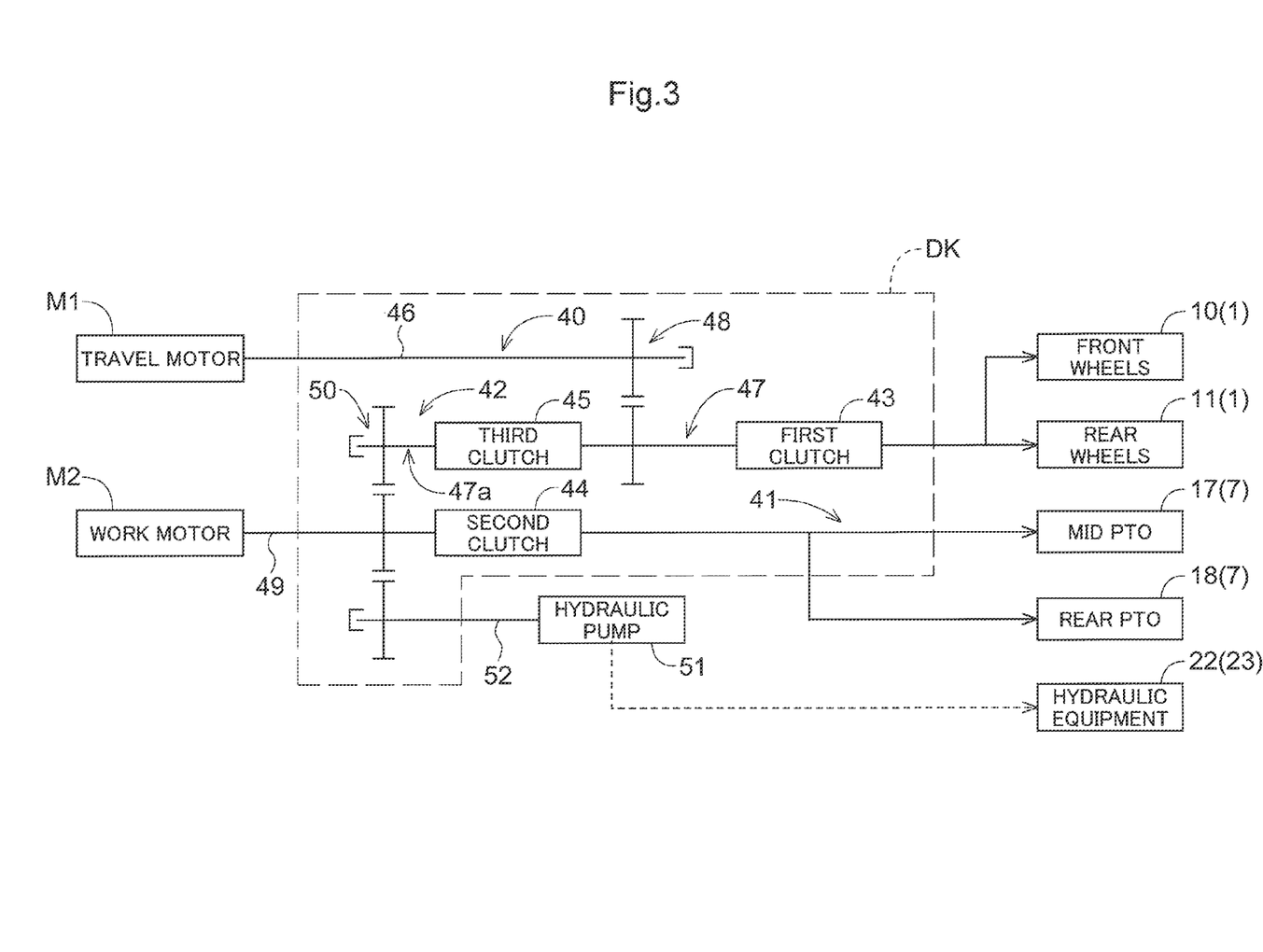
FIG. 3 is a diagram showing a flow of power transmission.

As shown in FIG. 3, the power-transmission-state switching mechanism DK includes a travel power transmission section 40 configured to transmit power between the travel motor M1 and the front and rear wheels 10 and 11, a work power transmission section 41 configured to transmit power between the work motor M2 and the power take-off shaft 7, and a relay power transmission section 42 capable of transmitting power between an intermediate portion of the travel power transmission section 40 and an intermediate portion of the work power transmission section 41.

The power-transmission-state switching mechanism DK includes: a first clutch 43 serving as a travel clutch mechanism capable of being switched between a power transmission state in which power from the travel motor M1 is transmitted to the front wheels 10 and the rear wheels 11, and a disengaged state in which the power transmission is disabled; a second clutch 44 serving as a work clutch mechanism capable of being switched between a power transmission state in which power from the work motor M2 is transmitted to the power take-off shaft 7, and a disengaged state in which the power transmission is disabled; and a third clutch 45 serving as a relay clutch mechanism capable of being switched between a power transmission state in which power transmission performed by the relay power transmission section 42 is enabled, and a disengaged state in which the power transmission is disabled.

The relay power transmission section 42 is capable of transmitting power between a portion of the travel power transmission section 40 that is located upstream of the first clutch 43 along a power transmission path, and a portion of the work power transmission section that is located upstream of the second clutch 44 along the power transmission path. The first clutch 43 is provided in the travel power transmission section 40. The second clutch 44 is provided in the work power transmission section 41. The third clutch 45 is provided at an intermediate portion of the relay power transmission section 42 along the power transmission path.

More specifically, the travel power transmission section 40 includes a first output shaft 46 to which power of the travel motor M1 is output, a relay power transmission shaft 47 to which power is transmitted from the first output shaft 46, a first gear mechanism 48 configured to interlock the first output shaft 46 and the relay power transmission shaft 47 with each other, and the first clutch 43 configured to enable and disable the power transmission performed via the relay power transmission shaft 47. The relay power transmission shaft 47 includes an extended shaft part 47a extending on a side opposite to the first clutch 43 relative to the first gear mechanism 48.

The work power transmission section 41 includes a second output shaft 49 to which power of the work motor M2 is output, and the second clutch 44 configured to enable and disable the power transmission performed via the second output shaft 49.

The relay power transmission section 42 includes the extended shaft part 47a of the relay power transmission shaft 47, a second gear mechanism 50 located at a shaft end portion of the extended shaft part 47a of the relay power transmission shaft 47, and the third clutch 45 located on the extended shaft part 47a at a position between the first gear mechanism 48 and the second gear mechanism 50 and configured to enable and disable the power transmission performed via the relay power transmission section 42.

The second gear mechanism 50 is interlocked in such a manner as to transmit power also to a drive shaft 52 of the hydraulic pump 51. Accordingly, the hydraulic pump 51 is driven in response to the work motor M2 being rotationally driven. The pressure oil supplied from the hydraulic pump 51 is supplied to the hydraulic equipment 22 such as the hydraulic cylinder 23. The hydraulic equipment 22 includes equipment other than the hydraulic cylinder 23.

Control Configuration

The tractor includes a control unit 53 configured to control the switching of the power-transmission-state switching mechanism DK.

Specifically, the first clutch 43, the second clutch 44, and the third clutch 45 of the power-transmission-state switching mechanism DK are configured to be solenoid operated and electrically switched. Also, as shown in FIG. 4, the tractor includes the control unit 53 configured to control the operation of the first clutch 43, the second clutch 44, and the third clutch 45. The control unit 53 controls the operation of the travel motor M1 and the work motor M2, in addition to the operation of the clutches. The control unit 53 controls the operation of the various parts in accordance with a preset control program.

Although not shown, the operation panel 54 of the driving section 3 includes an operation tool for performing various instruction operations, a meter panel that displays the traveling state and the work state of the vehicle body, and information (e.g., the charge amount and the temperature) about the battery 4, and so forth. The operation panel 54 is connected to the control unit 53. Various types of instruction information are input to the control unit 53 by a driver operating the operation tool according to the work condition.

Although not shown, an accelerator device 33 includes a lever configured to be swingably operated, and a potentiometer configured to be operated by swinging the lever. The accelerator device 33 is connected to a control device 34. The control unit 53 is configured to give instructions to the travel inverter 14 according to an instruction from the accelerator device 33. The travel inverter 14 is configured to, according to an instruction from the control unit 53, control the output of the travel motor M1 by adjusting the electric power supplied from the battery 4 to the travel motor M1.

The tractor includes an axle rotation sensor 55 configured to detect the axle rotation speed (corresponding to the body traveling speed) when the front wheels 10 and the rear wheels 11 are driven to rotate, and a PTO rotation sensor 56 configured to detect the rotation speed of the power take-off shaft 7. Information on these speeds is input to the control unit 53.

The tractor includes, in addition to the high-voltage battery 4, an electric component battery (not shown) that supplies electric power to the control unit 53 and various electric components electrically controlled by the control unit 53. The electric component battery supplies low-voltage (12 volts) electric power in order to drive the electric components. The control unit 53 is connected to the electric components via low voltage signal lines 57.

Control Performed by Control Unit

Figure 5:
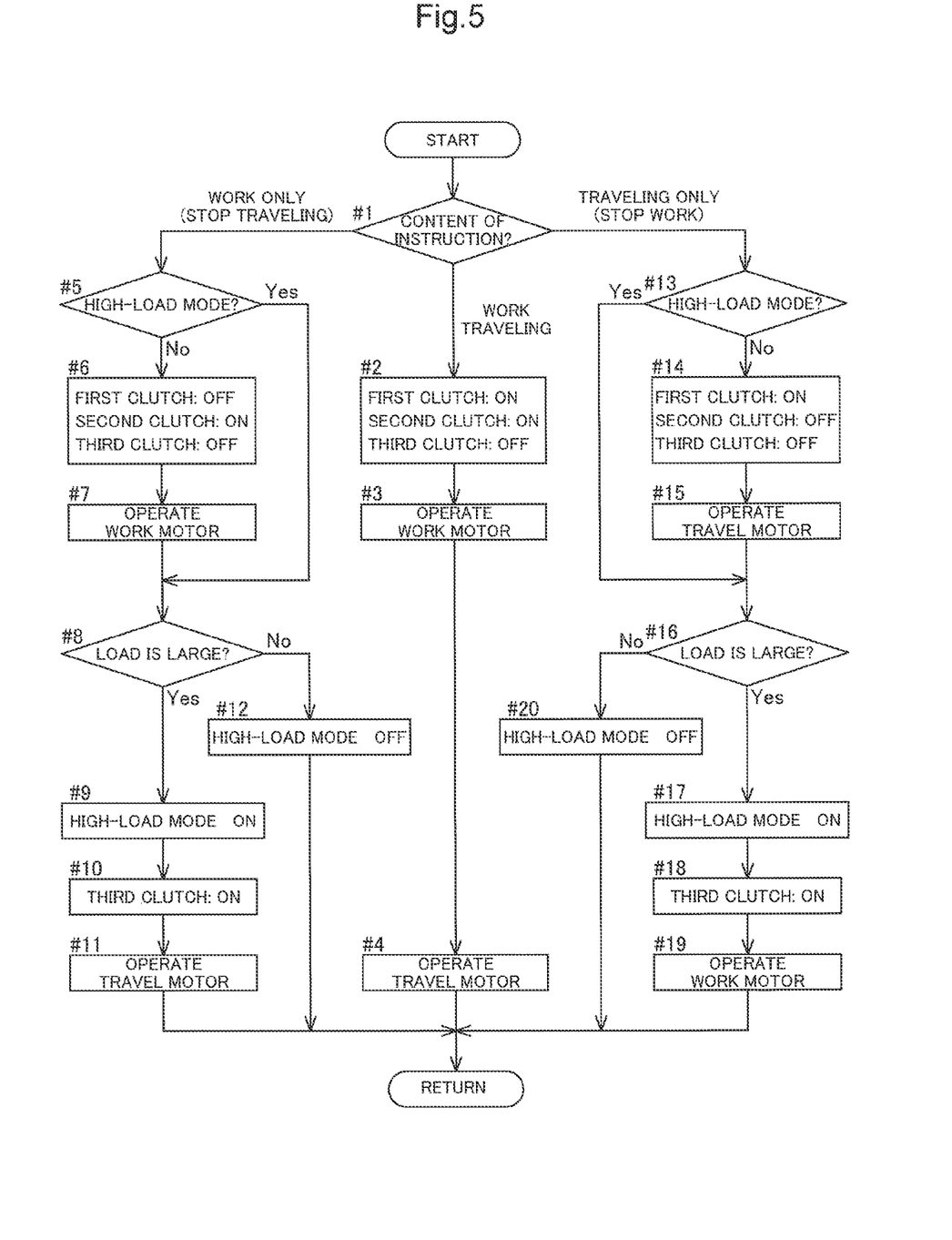
FIG. 5 is a flowchart illustrating control operations.

Control operations performed by the control unit 53 will be described below with reference to the flowchart shown in FIG. 5. Based on instruction operations performed on the operation panel 54 by the driver, the control unit 53 controls the operation of the travel motor M1 and the work motor M2, and controls the switching of the power-transmission-state switching mechanism DK.

Work Travel

In response to a work traveling state being instructed via the operation panel 54 (step #1), the control unit 53 causes the work device (mowing device 19) to operate while causing the vehicle body to travel. That is, in response to a work traveling state being instructed, the control unit 53 switches the first clutch 43 and the second clutch 44 to a clutch-on state (power transmission state), and switches the third clutch 45 to a clutch-off state (disengaged state) (step #2). Then, the control unit 53 causes the work motor M2 to operate such that the rotation speed of the power take-off shaft 7 detected by the PTO rotation sensor 56 reaches a set number of revolutions required for the work (step #3). Also, the control unit 53 causes the travel motor M1 to operate such that an axle rotation speed (corresponding to the body traveling speed) detected by the axle rotation sensor 55 reaches a rotation speed corresponding to a target speed set by the accelerator device 33 (step #4). The power transmission state of the power-transmission-state switching mechanism DK during the work travel corresponds to the independent power transmission state.

Work Only

In response to an instruction to perform only work being given via the operation panel 54, the control unit 53 causes the work device (mowing device 19) to operate while traveling of the vehicle body is stopped. That is, in response to "work only" being instructed (step #1), the control unit 53 switches the first clutch 43 and the third clutch 45 to the clutch-off state (disengaged state), and switches the second clutch 44 to the clutch-on state (power transmission state) (step #6). Then, the control unit 53 causes the work motor M2 to operate such that the rotation speed of the power take-off shaft 7 detected by the PTO rotation sensor 56 reaches a set number of revolutions required for the work (step #7).

In response to detection of an excessive load applied to the work motor M2 (e.g., due to a significant reduction in the rotation speed of the power take-off shaft 7 detected by the PTO rotation sensor 56 relative to the set number of revolutions) while the work motor M2 is operated (step #8), a high-load mode is set (step #9).

In response to a high-load mode being set, the control unit 53 switches the third clutch 45 to the clutch-on state (power transmission state) (step #10), and further causes the travel motor M1 to operate (step #11). The target rotation speed of the travel motor M1 at this time is set to the set number of revolutions required for the work. In this manner, it is possible to cause the work motor M2 and the travel motor M1 to operate cooperatively to achieve a significant driving force, thus disentangling entangled blades of grass.

After the high-load mode has been set, the above-described cooperative operation is continued until the high-load state is cancelled (steps #5, #8 to #11). In response to cancellation of the high-load state, the setting of the high-load mode is cancelled (step #12), and thereafter only the work motor M2 is operated (steps #6, #7, #8, #12).

The power transmission state of the power-transmission-state switching mechanism DK during "work only" corresponds to a second state of the cooperative output power transmission state. Note that possible cases where a high load is applied while the mowing device 19 is mounted as the work device include a case where a significant load is applied as a result of long blades of grass being entangled inside the mowing device 19 during traveling work, thus stopping the traveling.

Traveling Only

In response to an instruction to perform only traveling being given via the operation panel 54, the control unit 53 causes the travel motor M1 to operate while the operation of the work device is stopped. That is, in response to "traveling only" being instructed (step #1), the control unit 53 switches the second clutch 44 and the third clutch 45 to the clutch-off state (disengaged state), and switches the first clutch 43 to the clutch-on state (power transmission state) (step #14). Then, the control unit 53 causes the travel motor M1 to operate such that the axle rotation speed (corresponding to the body traveling speed) detected by the axle rotation sensor 55 reaches a rotation speed corresponding to the target traveling speed set by the accelerator device 33 (step #15).

In response to detection of an excessive load applied to the travel motor M1 (e.g., due to a significant reduction in the axle rotation speed detected by the axle rotation sensor relative to the rotation speed corresponding to the target traveling speed) while the travel motor M1 is operated, a high-load mode is set (steps #16, #17).

In response to the high-load mode being set, the control unit 53 switches the third clutch 45 to the clutch-on state (power transmission state) (step #18), and further causes the work motor M2 to operate (step #19). The target rotation speed of the work motor M2 at this time is set to the rotation speed corresponding to the target traveling speed. In this manner, it is possible to cause the work motor M2 and the travel motor M1 to operate cooperatively to achieve a significant driving force, thus performing traveling smoothly.

After the high-load mode has been set, the above-described cooperative operation is continued until the high-load state is cancelled (steps #13, #16 to #19). In response to cancellation of the high-load state, the setting of the high-load mode is cancelled (step #20), and thereafter only the travel motor M1 is operated (steps #14, #15, #16, #20).

The power transmission state of the power-transmission-state switching mechanism DK during "traveling only"

corresponds to a first state of the cooperative output power transmission state. Note that possible cases where a high load is applied while "traveling only" is instructed include a case where the vehicle body travels to a different location after completing work travel at a work site, or before performing work, as well as a case where a wheel or wheels become stuck in a muddy place, and is thus subjected to a significant travel resistance by mud.

Accordingly, the control unit 53 is capable of switching, based on a switching instruction, the cooperative output power transmission state between the first state in which power is output to the travel device 1 (front wheels 10, rear wheels 11) as a drive target, and the second state in which power is output to the power take-off shaft 7 as a drive target.

Figure 6:
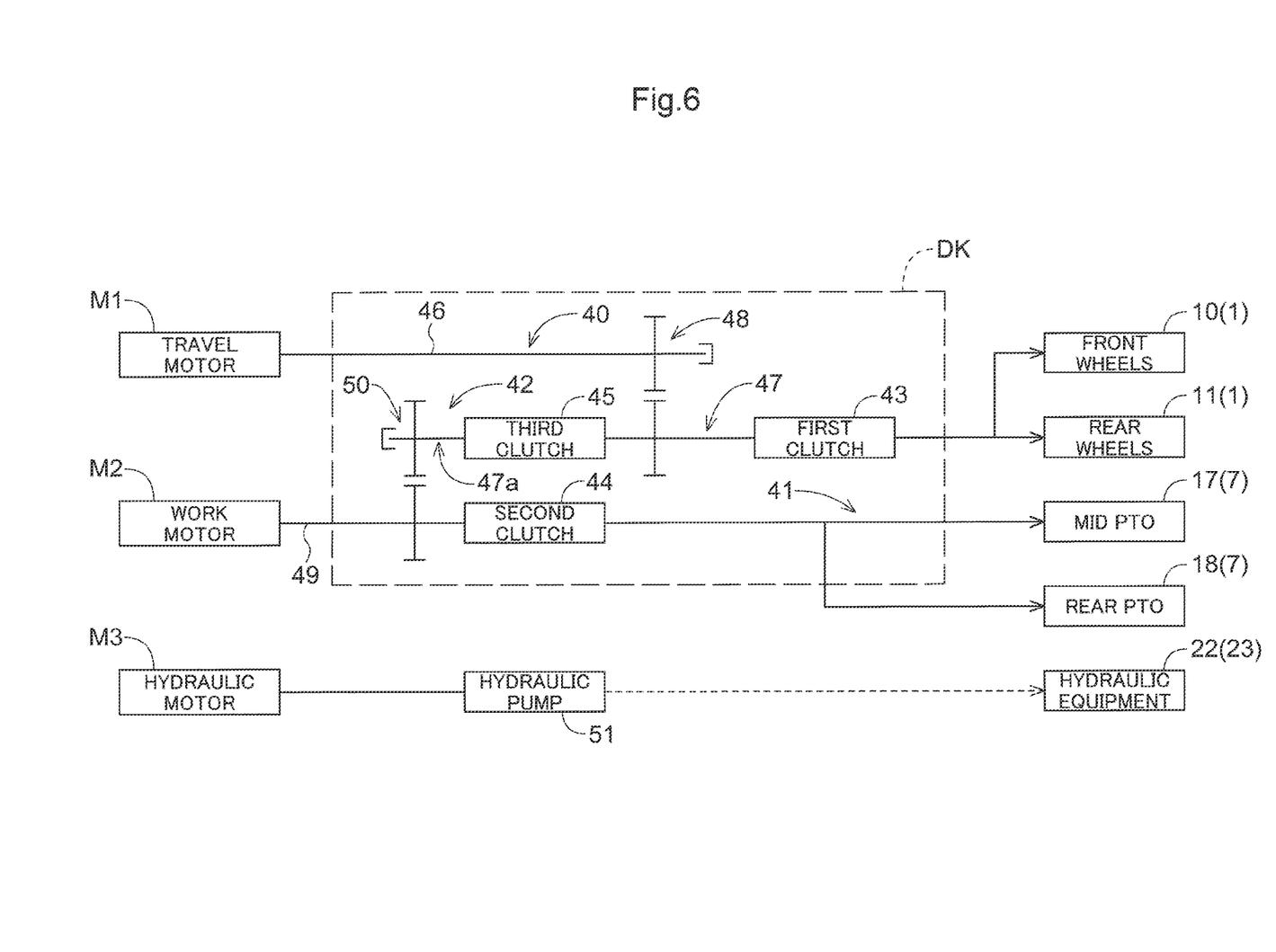
FIG. 6 is a diagram showing a flow of power transmission according to an alternative embodiment.

Alternative Embodiments (1) In the above embodiment, as shown in FIG. 6, the hydraulic pump 51 is driven by power from the work motor M2. However, in place of this configuration, it is possible to adopt a configuration including a dedicated hydraulic motor M3 for driving a hydraulic pump 51, separately from the work motor M2.

(2) The above embodiment adopts a configuration including one travel motor M1 and one work motor M2. However, it is possible to adopt a configuration including a plurality of travel motors M1, or a configuration including a plurality of work motors M2.

(3) The above embodiment adopts a configuration in which the power-transmission-state switching mechanism DK includes the three clutches 43, 44, and 45, and the relay power transmission section 42. However, in place of such a configuration, it is possible to adopt, for example, a configuration in which the independent power transmission state and the cooperative output power transmission state may be created with a planetary gear mechanism interposed between the travel power transmission section 40 and the work power transmission section 41.

(4) The above embodiment adopts a configuration including the mid PTO shaft 17 and the rear PTO shaft 18 as the power take-off shaft 7. In place of this configuration, it is possible to adopt configuration including only either the mid PTO shaft 17 or the rear PTO shaft 18, or a configuration including a PTO shaft different from the mid PTO shaft 17 and the rear PTO shaft 18.

(5) The above embodiment adopts a configuration in which the cooperative output power transmission state can be switched between the first state in which power is output to the travel device 1 (front wheels 10, rear wheels 11), and the second state in which power is output to the power take-off shaft 7. However, the cooperative output power transmission state may only include a state in which power is output to the travel device 1 (front wheels 10, rear wheels 11), or the cooperative output power transmission state may only include a state in which power is output to the power take-off shaft 7.

(6) The present invention is applicable to various work vehicles such as a tractor, a ride-on lawn mower, and a carrier vehicle.

What is claimed is:

1. A work vehicle comprising:
   a travel device supporting a body of the work vehicle in such a manner as to enable the body to travel;
   a power take-off shaft configured to output power out from the body;
   a travel electric motor configured to drive the travel device;
   a work electric motor configured to drive the power take-off shaft to rotate;
   a power-transmission-state switching mechanism configured to be switched between (i) an independent power transmission state in which output from the travel electric motor is output to the travel device and in which output from the work electric motor is output to the power take-off shaft, and (ii) a cooperative output power transmission state in which the travel electric motor and the work electric motor are capable of cooperatively outputting power exclusively to a drive target;
   wherein, the drive target can be the travel device; and
   a control unit configured to control switching of the power-transmission-state switching mechanism,
   wherein the power-transmission-state switching mechanism comprises:
      a travel clutch mechanism provided in a travel power transmission section between the travel electric motor and the travel device, and configured to be switched between a power transmission state in which power from the travel electric motor is transmitted to the travel device, and a disengaged state in which the transmission of power from the travel electric motor to the travel device is disabled;
      a work clutch mechanism provided in a work power transmission section between the work electric motor and the power take-off shaft, and configured to be switched between a power transmission state in which power from the work electric motor is transmitted to the power take-off shaft, and a disengaged state in which the transmission of power from the work electric motor to the power take-off shaft is disabled;
      a relay power transmission section configured to transmit power between a portion of the travel power transmission section that is located upstream of the travel clutch mechanism along a power transmission path, and a portion of the work power transmission section that is located upstream of the work clutch mechanism along the power transmission path; and
      a relay clutch mechanism configured to be switched between a power transmission state in which power transmission by the relay power transmission section is enabled, and a disengaged state in which the power transmission by the relay power transmission section is disabled, and
   wherein the relay clutch mechanism is provided coaxially with the travel clutch mechanism and is arranged upstream of the travel clutch mechanism along the power transmission path.

2. The work vehicle according to claim 1, wherein:
   the control unit switches, based on a switching instruction, the cooperative output power transmission state between a first state in which power is output to the travel device as the drive target, and a second state in which power is output to the power take-off shaft as the drive target.

* * * * *